(12) United States Patent
Vitiello et al.

(10) Patent No.: US 11,124,326 B2
(45) Date of Patent: Sep. 21, 2021

(54) PROCESS FOR CUTTING A WATER-SOLUBLE WEB

(71) Applicant: The Procter & Gamble Company, Cincinnati, OH (US)

(72) Inventors: Luca Vitiello, Brussels (BE); Florence Catherine Courchay, Brussels (BE); Robby Renilde Francois Keuleers, Lippelo (BE); Miguel Brandt Sanz, Tervuren (BE); Regine Labeque, Neder over Heembeek (BE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 15/930,499

(22) Filed: May 13, 2020

(65) Prior Publication Data

US 2020/0369424 A1  Nov. 26, 2020

(30) Foreign Application Priority Data

May 21, 2019 (EP) ..................... 19175778

(51) Int. Cl.
| | | |
|---|---|---|
| *B65B 61/08* | (2006.01) | |
| *B65H 35/00* | (2006.01) | |
| *B65B 9/04* | (2006.01) | |
| *B23D 36/00* | (2006.01) | |
| *B65B 57/02* | (2006.01) | |
| *B65B 57/16* | (2006.01) | |

(52) U.S. Cl.
CPC ......... *B65B 61/08* (2013.01); *B65H 35/0086* (2013.01); *B23D 36/0041* (2013.01); *B65B 9/042* (2013.01); *B65B 57/02* (2013.01); *B65B 57/16* (2013.01)

(58) Field of Classification Search
CPC ......... B65B 61/08; B65B 9/042; B65B 57/02; B65B 57/16; B65H 35/0086; B23D 36/0041
USPC ............................. 83/311, 324, 363
See application file for complete search history.

(56) References Cited

U.S. PATENT DOCUMENTS

| | | | |
|---|---|---|---|
| 2008/0028902 A1 | 2/2008 | Baggot et al. | |
| 2013/0036884 A1* | 2/2013 | Schurch | B31B 50/74 83/37 |
| 2015/0336691 A1 | 11/2015 | Fowler et al. | |
| 2015/0336692 A1* | 11/2015 | Brandt Sanz | B65B 37/00 53/450 |
| 2017/0101204 A1 | 4/2017 | Waterman | |

(Continued)

OTHER PUBLICATIONS

PCT Search Report for appl. No. PCT/US2020/070043, dated Jul. 24, 2020, 13 pages.

(Continued)

*Primary Examiner* — Kenneth E Peterson
*Assistant Examiner* — Liang Dong
(74) *Attorney, Agent, or Firm* — Gregory S. Darley-Emerson

(57) ABSTRACT

Process for cutting a water-soluble web in a cross-machine direction. Each cutting cycle contains at least two speeds. A first speed matches that of the speed of the water-soluble web and is also the speed at the point of cutting, and a second speed is faster than the speed of the water-soluble web in the machine direction and is the speed at a point in-between two cutting actions.

17 Claims, 4 Drawing Sheets

(56) References Cited

U.S. PATENT DOCUMENTS

2018/0154540 A1\* 6/2018 Bittner .................... B26D 1/62
2018/0370703 A1\* 12/2018 Boswell .................. C08J 7/048

OTHER PUBLICATIONS

EP Search Report for appl. No. 19175778.0-1016, dated Jan. 3, 2020, 7 pages.

\* cited by examiner

PROCESS FOR CUTTING A WATER-SOLUBLE WEB

FIELD OF THE INVENTION

Process for cutting a water-soluble web in a cross-machine direction.

BACKGROUND OF THE INVENTION

Water-soluble unit dose articles are known and liked by consumers. Without wishing to be bound by theory, such unit dose articles are often made by deforming a first water-soluble film in a mould to create a cavity, filling said cavity with a composition such as a detergent composition and closing said cavity with a second water-soluble film and sealing the first and second water-soluble films together. Optionally, the second water-soluble film can itself comprise further cavities, such that cavities can be 'superposed' on top of one another.

The water-soluble unit dose articles are made initially as a water-soluble web of capsules attached together via the water-soluble film. Without wishing to be bound by theory, a single first water-soluble film is deformed across an array of moulds to simultaneously create a number of open cavities. These are all then filled and sealed with at least a second water-soluble film. Once sealed, the water-soluble web is cut to produce the individual water-soluble unit dose articles.

At least two separate cutting actions often need to be achieved, one in the machine direction and one in the cross-machine direction. Such cutting can be achieved using rotating knife rolls. Such knife rolls often comprise a cylindrical surface with one or more knives protruding from said surface and arranged around the circumference of the cylinder. Especially in the case of non-machine direction cutting, there is a tendency for the protruding knife to accidentally cut the unit dose articles that protrude above the surface of the moulds. This is especially the case for so called superposed unit dose articles in which detergent filled compartments are arranged one on top of the other. Such accidental cutting causes the capsules to prematurely rupture.

The accidental cutting can be avoided by running the lines at slow line speeds or via an intermittent (stop/start) process, but such processes are not preferred as they limit the capacity of the production lines.

Therefore, there is a need in the art for a process for cutting a water-soluble web comprising protruding capsules wherein the incidents of accidental rupture of said capsules is reduced, wherein the process also enables a continuous making process and maximizes process line speeds.

It was surprisingly found that the process of the present invention achieved this.

SUMMARY OF THE INVENTION

The present disclosure relates to a process for cutting a water-soluble web comprising the steps of:
a. providing an anvil;
b. providing a rotating knife roll, wherein said rotating knife roll comprises between 1 and 10 knives mounted on said rotating knife roll, and wherein each individual knife comprises a cutting edge wherein said cutting edge extends outwards from said rotating knife roll;
c. providing a water-soluble web, wherein the water-soluble web comprises;
   i. flat areas wherein the flat areas comprise a first side and a second side, wherein the first side contacts the anvil and the knife contacts the second side during cutting, and wherein the flat areas have a thickness of between 50 microns and 400 microns;
   ii. and filled capsules formed within the water-soluble web, wherein the capsules are connected to and separated from one another by the flat areas and wherein the capsules protrude outwards from the second side; and
wherein said water-soluble web is moving in a machine direction at a constant speed $V_1$;
d. passing said water-soluble web between said anvil and said rotating knife roll, wherein the first side of the water-soluble web is in contact with the anvil;
e. cutting said water-soluble web with said knives as said water-soluble web passes between said anvil and said rotating knife roll;
wherein, the rotating knife roll rotates at variable speeds, and wherein a single complete rotation of the rotating knife roll consists of a number of cutting cycles, wherein the number of cutting cycles is equal to the number of knives on the rotating knife roll and wherein during a single cutting cycle, said rotating knife roll rotates at least at a first rotational speed $R_1$ and a second rotational speed $R_2$;
wherein $R_1$ equals $V_1$, and $R_2$ is at least 15% faster than $R_1$; and
wherein the rotating knife roll is rotating at $R_1$ when each individual knife cuts said water-soluble web in a cross-machine direction, and wherein each cut of the water-soluble web is performed by only one of the knives at a time.

DETAILED DESCRIPTION OF THE INVENTION

Process

Figure 1:
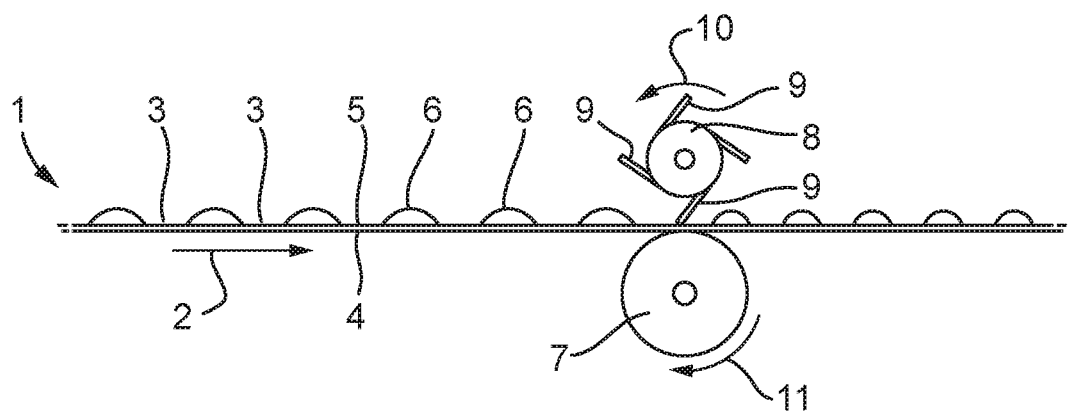
FIG. 1 discloses the process according to the present disclosure.

The present disclosure relates to a process for cutting a water-soluble web, preferably to a process of cutting a water-soluble web in a non-machine direction. The water-soluble web is described in more details below. However, the water-soluble web comprises flat areas and filled capsules. The water-soluble web has a first side and a second side. The flat areas comprise a first side and a second side corresponding to the first side and the second sides of the water-soluble web and the flat areas have a thickness of between 50 microns and 400 microns. The filled capsules are formed within the water-soluble web. The capsules are connected to and separated from one another by the flat areas and the capsules protrude outwards from the second side. The water-soluble web is described in more detail below.

The process comprises the step of;
  a. providing an anvil.

The first side of the water-soluble web contacts the anvil. The anvil is a rigid material against which the water-soluble web can be cut by the knife. Those skilled in the art will be aware of suitable anvil structures and materials. Preferably, the anvil is made from steel, more preferably hardened steel. Preferably, the anvil is a rotating anvil, more preferably a rotating cylindrical anvil. Without wishing to be bound by theory, the rotating cylindrical anvil has an axial direction around which it rotates and a curved surface. The curved surface contacts the first side of the water-soluble web, and the rotating cylindrical anvil is oriented such that the water-soluble web passes over the curved surface. In other words, the axial direction is perpendicular to the direction of movement of the water-soluble web.

As discussed in more detail below, the capsules protrude outwards from the second side of the water-soluble web and optionally as well outwards from the first side of the water-soluble web. When the capsules protrude from the first side of the water-soluble web the anvil comprises cavities to receive the capsules protruding outwards from the first side. Preferably, the capsules protrude outwards from the second side of the water-soluble web by between 2 mm and 15 mm, preferably between 3 mm and 13 mm. When present, preferably, the anvil comprises cavities having a depth between 5 mm and 30 mm, preferably between 7 mm and 25 mm.

The process comprises the step of;
  b. providing a rotating knife roll.

The rotating knife roll comprises between 1 and 10 knives, preferably between 2 and 8 knives, more preferably between 4 and 6 knives mounted on said knife roll. Each individual knife comprises a cutting edge wherein said cutting edge extends outwards from said rotating knife roll. Preferably, the knives are spaced apart equally around said rotating knife roll. Preferably, the knife roll has a cylindrical shape and each knife protrudes from the surface of said cylindrical knife roll. Without wishing to be bound by theory, the rotating cylindrical knife roll has a curved surface and an axial direction around which the rotating cylindrical knife roll rotates. The rotating cylindrical knife roll is orientated such that the axial direction is perpendicular to the direction of movement of the water-soluble web. The knives are oriented such that their cutting edges are oriented parallel to the elongated direction of the knife roll.

Those skilled in the art will be aware of suitable knife designs. Each knife may be formed from a single piece of thin metal, ceramic or a mixture thereof.

Each knife comprises a cutting edge. Those skilled in the art will be aware of suitable cutting edges. The cutting edge can be shaped in any of the grinds common in the art of knife making. Such cuts can include, but not be limited to, a cut selected from the group consisting of hollow ground, flat ground, saber ground, chisel ground, compound bevel, convex ground, and combinations thereof.

Said cutting edge extends outwards from said rotating knife roll. Those skilled in the art will be aware of suitable means to attach each knife to the rotating knife roll.

The knife can be attached to the rotating knife roll via any suitable means. Those skilled in the art will be aware of suitable attachment means. Each knife may be attached to the rotating knife roll via through hole bolts with bolt holes provided in the knife. Each knife may be connected to the rotating knife roll by a pinch grip or wedge grip. The gripping force in such grips can be applied by a screw mechanism or spring mechanism.

Preferably, the knife roll comprises a surface and each knife protrudes from the surface of said rotating knife roll and each knife is positioned at an angle between 5° and 90°, preferably between 10° and 80°, more preferably between 30° and 60°, most preferably between 40° and 50° relative to the surface of the rotating knife roll. The angle is defined as the angle between the protrusion direction of the knife from the surface of said rotating knife roll and the plane perpendicular to the circular radius of the rotating knife roll at the point where the knife is connected to the knife roll. Preferably, each knife is orientated such to effect a cut to the water-soluble web in a cross direction. Without wishing to be bound by theory, the machine direction is understood to mean the direction of movement of the water-soluble web. The cross direction is understood to mean substantially perpendicular to the machine direction. Preferably the cross direction is between 80° and 100°, preferably between 85° and 95° relative to the machine direction.

The process comprises the additional step of;
  c. providing a water-soluble web. The water-soluble web is described in more detail below.

The water-soluble web moves in a machine direction at a constant speed $V_1$. Without wishing to be bound by theory, the machine direction is understood to mean the direction of movement of the water-soluble web. The cross direction is understood to mean substantially perpendicular to the machine direction. Preferably the cross direction is between 80° and 100°, preferably between 85° and 95° relative to the machine direction.

Preferably, $V_1$ is between 1 m/s and 30 m/s, preferably between 2 m/s and 20 m/s.

The process comprises the further step of;
  d. passing said web between said anvil and said rotating knife roll, wherein the water-soluble web is in contact with the anvil.

The first side of the water-soluble web is in direct contact with the anvil. Without wishing to be bound by theory, the anvil is a rigid material against which the water-soluble web can be cut by the knife. The anvil is described in more detail above.

The process comprises the further step of;
  e. cutting said water-soluble web with said knives as said water-soluble web passes between said anvil and said rotating knife roll.

Without wishing to be bound by theory, the knife is brought into contact with the second side of the flat area of the water-soluble web. The knife is positioned such that the cutting edge cuts through the full thickness of the water-soluble web at the point of contact between the cutting edge and the water-soluble web. The anvil acts as a support to enable a complete cut through the water-soluble web by the knife. Those skilled in the art will know how to set up appropriate apparatus to achieve this. The water-soluble web is cut substantially perpendicular to the machine direction, preferably between 80° and 100°, more preferably between 85° and 95° relative to the machine direction.

The rotating knife roll rotates at variable speeds. A single complete rotation of the rotating knife roll consists of a number of cutting cycles, wherein the number of cutting cycles is equal to the number of knives on the rotating knife roll. For example, if the rotating knife roll contains 4 knives, then there will be 4 cutting cycles, if there are 6 knives, then there will be 6 cutting cycles etc. Those skilled in the art will recognize how to calculate the number of cutting cycles. During a single cutting cycle, said rotating knife roll rotates at least at a first rotational speed $R_1$ and at a second rotational speed $R_2$. $R_1$ equals $V_1$, and $R_2$ is at least 15% faster than $R_1$. Preferably, $R_2$ is between 50% and 3000% faster, more preferably between 100% and 2000% faster, more preferably between 500% and 1500% faster than $R_1$. By '$R_1$ equals $V_1$' we herein mean that $R_1$ is as close as possible to being equal to $V_1$. There may be slight variations due to minor apparatus imperfections etc., which means there may a slight variation in speed. Such variation may be between 1% and 5%. Without wishing to be bound by theory, $V_1$ is measured as a constant speed in relevant units, such as m/min or m/s. $R_1$ is a rotational speed, therefore in order for $R_1$ to match $V_1$, $R_1$ should be calculated as the speed that the tip of the cutting edge of the knife is moving at the point it cuts the water-soluble web, measured in m/min or m/s. $R_2$ can be calculated in the same was as for $R_1$. Without wishing to be bound by theory, the tip of the cutting edge should be understood to be the point on the cutting edge that is furthest from the axis of rotation of the knife roll.

Without wishing to be bound by theory, each cutting cycle contains at least two speeds. A first speed matches that of the speed of the water-soluble web and is also the speed at the point of cutting, and a second speed is faster than the speed of the water-soluble web in the machine direction and is the speed at a point in-between two cutting actions. Once the rotating knife roll travels at $R_2$ it then slows back down again to $R_1$ for the next cutting cycle after which it accelerates again to $R_2$. A single cutting cycle may comprise the following sequence;

$R_1$-$R_2$-$R_1$.

In this case the rotating knife roll rotates at speed $R_1$ at point of cutting followed by acceleration to speed $R_2$ to reposition to the next cutting knife for the next cutting action, followed by deceleration back down to $R_1$ ready for the consequent cutting step.

Preferably, the rotating knife roll is rotating at $R_1$ when each individual knife cuts said water-soluble web in the cross-direction. There may be slight variations due to minor apparatus imperfections etc., which means there may a slight variation in speed. Such variation may be between 0% and 5%, or even between 1% and 5%. Preferably, each cut of the water-soluble web is performed by only one of the knives of the rotating knife roll at a time.

Without wishing to be bound by theory, $R_2$ should be understood to be the maximum speed of the rotating knife roll during a cutting cycle. The rotating knife roll will have a period of acceleration as it moves from $R_1$ to $R_2$. After the knife roll has reached $R_2$ it then has a period of deceleration as it returns to a constant speed of $R_1$. Therefore, when $R_2$ is calculated, it should be calculated as the maximal rotational speed, and not the periods of acceleration from $R_1$ or deceleration back to $R_1$. $R_2$ is the same maximum speed during each cutting cycle, however, there may be slight variations due to minor apparatus imperfections etc., which means there may a slight variation in speed. Such variation may be between 0% and 5%, or even between 1% and 5%.

Preferably, each individual knife is travelling at the speed $R_1$ for between 25% and 75%, preferably between 35% and 75% of the time it takes for each individual knife to do one full rotation.

Preferably, the process comprises a further step of cutting the web in a machine direction, preferably wherein the cutting of the web in the machine direction is via a continuous constant speed cutting device, preferably a rotating knife. Preferably, the speed of the cutting edge of the knife during the machine direction cutting operation is between 25% greater and 25% smaller, preferably between 10% greater and 10% smaller, more preferably between 5% greater and 5% smaller than the speed of the water-soluble web.

Preferably, the web comprises at least two rows of capsules wherein the rows are arranged in the machine direction and wherein a single rotating knife roll cuts each row or wherein a separate rotating knife roll cuts each row individually or a combination thereof.

The process of cutting the water-soluble web is preferably a continuous process.

Cutting the water-soluble web in the machine direction and cross direction results in the formation of individual water-soluble unit dose articles. Without wishing to be bound by theory, a unit dose article is intended for a single use application. They are preferably filled with a treatment composition for application to fabrics or hard surfaces for example. Upon addition of the unit article to water, the water-soluble film making up the water-soluble web (see below) dissolves or disintegrates releasing the internal treatment composition into the surrounding water to create a wash liquor. This wash liquor is then used to treat fabrics or hard surfaces.

Water-Soluble Web

Preferably, the water-soluble web has a water-solubility of at least 50%, preferably at least 75% or even at least 95%, as measured by the method set out here after using a glass-filter with a maximum pore size of 20 microns:

5 grams±0.1 gram of web material is added in a pre-weighed 3 L beaker and 2 L±5 ml of distilled water is added. This is stirred vigorously on a magnetic stirrer, Labline model No. 1250 or equivalent and 5 cm magnetic stirrer, set at 600 rpm, for 30 minutes at 30° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersibility can be calculated The water-soluble web comprises flat areas and filled capsules. Without wishing to be bound by theory, the flat areas should be understood to represent the areas between the capsules. The flat areas may not be straight, for example may be curved around the rotating anvil, but they do not comprise any capsules.

The flat areas comprise a first side and a second side and have a thickness of between 50 microns and 400 microns. The first side contacts the anvil. In other words, the first side is in direct physical contact with the surface of the anvil. The knife contacts the second side of the flat area during cutting. Without wishing to be bound by theory, the anvil operates to support the water-soluble web during the cutting operation to allow effective and efficient cutting of the web.

The web further comprises filled capsules formed within the water-soluble web and the capsules protrude outwards from the second side. The capsules are connected to and separated from one another by the flat areas. The method for making the capsules is described in more detail below. Preferably, the capsules protrude outwards from the second side by between 2 mm and 15 mm, preferably between 3 mm and 13 mm. Without wishing to be bound by theory, the distance they protrude is measured as the distance between the surface of the flat area of the second side and the highest point on the capsule from said surface of the flat area of the second side.

The capsules may protrude outwards from the first side as well as outwards from the second side. When the capsules protrude from the first side as well as the second side, the anvil comprises cavities to receive the capsules protruding outwards from the first side. Preferably, where applicable, the capsules protrude outwards from the first side by between 5 mm and 30 mm, preferably between 7 mm and 25 mm. Without wishing to be bound by theory, the distance they protrude is measured as the distance between the surface of the flat area of the first side and the highest point on the capsule from said surface of the flat area of the first side. The cavities in the anvil will be of a sufficient and appropriate size to accommodate the capsules. Preferably, the cavities have a width of between 10 mm and 100 mm, preferably between 20 mm and 80 mm, preferably between 30 mm and 60 mm and a length of between 10 mm and 100 mm, preferably between 20 mm and 80 mm, preferably between 30 mm and 60 mm. The anvil is described in more detail above.

Preferably, the web comprises a water-soluble polyvinyl alcohol polymer, a water-soluble polyvinyl alcohol copolymer, or a mixture thereof.

Preferred web materials are preferably polymeric materials. The web material can, for example, be obtained by casting, blow-moulding, extrusion or blown extrusion of the polymeric material, as known in the art.

Preferably, the water-soluble web comprises polyvinyl alcohol polymer or copolymer, preferably a blend of polyvinylalcohol polymers and/or polyvinylalcohol copolymers, preferably selected from sulphonated and carboxylated anionic polyvinylalcohol copolymers especially carboxylated anionic polyvinylalcohol copolymers, most preferably a blend of a polyvinylalcohol homopolymer and a carboxylated anionic polyvinylalcohol copolymer.

Preferred webs exhibit good dissolution in cold water, meaning unheated distilled water. Preferably such webs exhibit good dissolution at temperatures of 24° C., even more preferably at 10° C. By good dissolution it is meant that the film exhibits water-solubility of at least 50%, preferably at least 75% or even at least 95%, as measured by the method set out here after using a glass-filter with a maximum pore size of 20 microns, described above.

The web may be opaque, transparent or translucent. The web may comprise a printed area.

The area of print may be achieved using standard techniques, such as flexographic printing or inkjet printing.

The web may comprise an aversive agent, for example a bittering agent. Suitable bittering agents include, but are not limited to, naringin, sucrose octaacetate, quinine hydrochloride, denatonium benzoate, or mixtures thereof. Any suitable level of aversive agent may be used in the film. Suitable levels include, but are not limited to, 1 to 5000 ppm, or even 100 to 2500 ppm, or even 250 to 2000 rpm.

Preferably, the closest distance between the edge of one capsule and the edge of any adjacent capsule is between 3 mm and 15 mm, preferably between 5 mm and 10 mm.

Method of Forming Capsules

The water-soluble web comprises capsules connected to one another by flat areas. Preferably, the capsules are filled with a treatment composition. The treatment composition is described in more detail below.

Preferably, the capsules are made via the following process. A first water-soluble film is deformed into a mould to form an open compartment. The water-soluble film is described in more detail below. Preferably, a treatment composition is added to the open compartment. The open compartment is then closed with a second water-soluble film. The first and second water soluble films are then sealed via heat, solvent, pressure or a mixture thereof to form the capsule. Preferably sealing is via solvent sealing more preferably a solvent comprising water. Without wishing to be bound by theory, such a process involves making a plurality of such capsules joined together by non-thermoformed film to create the water-soluble web. The non-thermoformed films are the flat areas of the water-soluble web between the capsules. Therefore, the flat areas may comprise two or more water-soluble films sealed together.

Alternatively, the second film may comprise one or more closed compartments, used to close the open compartment of the first film. This means a superposed article is made in which one or more compartments of the second film are positioned above the compartment of the first film.

The deformation may be achieved via thermoforming, vacuum-forming or a combination thereof.

The process for making the capsules could be an automated manufacturing process, such as a conveyer belt, a series of conveyer belts. Alternatively, the process for making the capsules may be a manual manufacturing line, in which the one or more sequences or steps are conducted manually. Most preferably the process is an automated process.

Preferably, the process of making the capsules is a continuous process. Alternatively, the process of making the capsules may be an intermittent or batch process. Preferably the process of making the capsules is a continuous making process.

An exemplary means of making the unit dose article using a cutting process according to the present invention is a continuous process for making a water-soluble unit dose article, comprising the steps of:
  a. continuously feeding a first water-soluble film onto a horizontal portion of a continuously and rotatably moving endless surface, which comprises a plurality of moulds, or onto a non-horizontal portion thereof and continuously moving the film to said horizontal portion;
  b. forming from the film on the horizontal portion of the continuously moving surface, and in the moulds on the surface, a continuously moving, horizontally positioned web comprising open capsules;
  c. filling the open capsules with a treatment composition, to obtain a horizontally positioned web of open, filled capsules;
  d. preferably continuously, closing the web of open capsules, to obtain closed capsules, preferably by feeding a second water-soluble film onto the horizontally positioned web of open, filed capsules, to obtain closed capsules; and
  e. optionally sealing the first and second water-soluble films to obtain a web of closed capsules connected by flat areas.

A first web of open capsules may be combined with a second web of closed capsules preferably wherein the first and second webs are brought together and sealed together via a suitable means, and preferably wherein the second web is on a rotating drum set-up. In such a set-up, open capsules are filled at the top of the drum and preferably sealed afterwards with a layer of film, the closed capsules come down to meet the first web of open capsules, formed preferably on a horizontal forming surface. It has been found especially suitable to place the rotating drum unit above the horizontal forming surface unit. Alternatively, both the first and the second making unit can be a rotating drum unit positioned above or aside to each other.

The resultant web of closed capsules connected via flat areas is consequently transferred to a cutting station and cut to produce individual unit dose articles, following the cutting process of the invention, as described above.

The film of the present invention is soluble or dispersible in water. The water-soluble film preferably has a thickness of from 20 to 150 micron, preferably 35 to 125 micron, even more preferably 50 to 110 micron, most preferably about 76 micron.

Preferably, the film has a water-solubility of at least 50%, preferably at least 75% or even at least 95%, as measured by the method set out here after using a glass-filter with a maximum pore size of 20 microns:

5 grams±0.1 gram of film material is added in a pre-weighed 3 L beaker and 2 L±5 ml of distilled water is added. This is stirred vigorously on a magnetic stirrer, Labline model No. 1250 or equivalent and 5 cm magnetic stirrer, set at 600 rpm, for 30 minutes at 30° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersibility can be calculated.

Preferred film materials are preferably polymeric materials. The film material can, for example, be obtained by casting, blow-moulding, extrusion or blown extrusion of the polymeric material, as known in the art.

Preferred polymers, copolymers or derivatives thereof suitable for use as pouch material are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the pouch material, for example a PVA polymer, is at least 60%. The polymer can have any weight average molecular weight, preferably from about 1000 to 1,000,000, more preferably from about 10,000 to 300,000 yet more preferably from about 20,000 to 150,000.

Preferably, the water-soluble film comprises polyvinyl alcohol polymer or copolymer, preferably a blend of polyvinylalcohol polymers and/or polyvinylalcohol copolymers, preferably selected from sulphonated and carboxylated anionic polyvinylalcohol copolymers especially carboxylated anionic polyvinylalcohol copolymers, most preferably a blend of a polyvinylalcohol homopolymer and a carboxylated anionic polyvinylalcohol copolymer.

Preferred films exhibit good dissolution in cold water, meaning unheated distilled water. Preferably such films exhibit good dissolution at temperatures of 24° C., even more preferably at 10° C. By good dissolution it is meant that the film exhibits water-solubility of at least 50%, preferably at least 75% or even at least 95%, as measured by the method set out here after using a glass-filter with a maximum pore size of 20 microns, described above.

The film may be opaque, transparent or translucent. The film may comprise a printed area.

The area of print may be achieved using standard techniques, such as flexographic printing or inkjet printing. The area of print might be on the inside or the outside of the water-soluble unit dose article. The printed area may comprise a single colour or a plurality of colours, preferably selected from black, white, red or a mixture thereof.

The film may comprise an aversive agent, for example a bittering agent. Suitable bittering agents include, but are not limited to, naringin, sucrose octaacetate, quinine hydrochloride, denatonium benzoate, or mixtures thereof. Any suitable level of aversive agent may be used in the film. Suitable levels include, but are not limited to, 1 to 5000 ppm, or even 100 to 2500 ppm, or even 250 to 2000 rpm.

Preferred films are those supplied by Monosol under the trade references M8630, M8900, M8779, M8310, and their analogous films comprising bittering agent.

The resulting water-soluble unit dose article may comprise a lubricating coating. The lubricating coating may comprise talc, zinc oxide, silicas, siloxanes, zeolites, silicic acid, alumina, sodium sulphate, potassium sulphate, calcium carbonate, magnesium carbonate, sodium citrate, sodium tripolyphosphate, potassium citrate, potassium tripolyphosphate, calcium stearate, zinc stearate, magnesium stearate, starch, modified starches, clay, kaolin, gypsum, cyclodextrins or mixtures thereof.

The resulting unit dose article preferably comprises at least two compartments, or even at least three compartments. The compartments may be arranged in superposed orientation, i.e. one positioned on top of the other. Alternatively, the compartments may be positioned in a side-by-side orientation, i.e. one orientated next to the other. The compartments may even be orientated in a 'tyre and rim' arrangement, i.e. a first compartment is positioned next to a second compartment, but the first compartment at least partially surrounds the second compartment, but does not completely enclose the second compartment. Alternatively, one compartment may be completely enclosed within another compartment.

One of the compartments may be smaller than the other compartment. Wherein the unit dose article comprises at least three compartments, two of the compartments may be smaller than the third compartment, and preferably the smaller compartments are superposed on the larger compartment. The superposed compartments preferably are orientated side-by-side.

In a multi-compartment orientation, the treatment composition according to the present invention may be comprised in at least one of the compartments. It may for example be comprised in just one compartment, or may be comprised in two compartments, or even in three compartments.

Each compartment may comprise the same or different compositions. The different compositions could all be in the same form, or they may be in different forms, for example liquid or powder.

Treatment Composition

The treatment composition may be selected from a laundry treatment composition, dishwashing composition, hard surface treatment composition or a mixture thereof, preferably a laundry treatment composition, more preferably a laundry treatment composition selected from laundry detergent composition, laundry softening composition, laundry freshness composition or a mixture thereof, preferably a laundry detergent composition. Preferred laundry and automatic dishwashing detergent compositions are described in more detail below.

Automatic Dishwashing Detergent Composition

The treatment composition may be an automatic dish washing composition comprising an ingredient selected from surfactant, builder, sulfonated/carboxylated polymer, silicone suds suppressor, silicate, metal and/or glass care agent, enzyme, bleach, bleach activator, bleach catalyst, source of alkalinity, perfume, dye, solvent, filler and mixtures thereof.

A preferred surfactant for use in automatic dishwashing detergents is low foaming by itself or in combination with other components (e.g. suds suppressers). Preferred for use herein are low and high cloud point nonionic surfactants and mixtures thereof including nonionic alkoxylated surfactants (especially ethoxylates derived from $C_6$-$C_{18}$ primary alcohols), ethoxylated-propoxylated alcohols (e.g., Olin Corporation's POLY-TERGENT® SLF18), epoxy-capped poly (oxyalkylated) alcohols (e.g., Olin Corporation's POLY-TERGENT® SLF18B, ether-capped poly(oxyalkylated) alcohol surfactants, and block polyoxyethylene-polyoxypropylene polymeric compounds such as PLURONIC®, REVERSED PLURONIC®, and TETRONIC® series by the BASF-Wyandotte Corp., Wyandotte, Mich.; amphoteric surfactants such as the $C_{12}$-$C_{20}$ alkyl amine oxides (preferred amine oxides for use herein include lauryldimethyl amine oxide and hexadecyl dimethyl amine oxide), and alkyl amphocarboxylic surfactants such as MIRANOL™ C2M; and zwitterionic surfactants such as the betaines and sultaines; and mixtures thereof. Surfactants can be present at a level of from 0.2% to 30% by weight, more preferably from 0.5% to 10% by weight, most preferably from 1% to 5% by weight of a detergent composition.

Builders suitable for use in the detergent composition described herein include water-soluble builders, including citrates, carbonates, silicate and polyphosphates, e.g. sodium tripolyphosphate and sodium tripolyphosphate hexahydrate, potassium tripolyphosphate and mixed sodium and potassium tripolyphosphate salts.

Enzymes suitable for use in the detergent composition described herein include bacterial and fungal cellulases including CAREZYME® and CELLUZYME® (Novo Nordisk A/S); peroxidases; lipases including AMANO-P® (Amano Pharmaceutical Co.), M1 LIPASE® and LIPOMAX® (Gist-Brocades) and LIPOLASE® and LIPOLASE ULTRA® (Novo); cutinases; proteases including ESPERASE®, ALCALASE®, DURAZYM® and SAVINASE® (Novo) and MAXATASE®, MAXACAL®, PROPERASE® and MAXAPEM® (Gist-Brocades); α and β amylases including PURAFECT® OX AM (Genencor) and TERMAMYL®, BAN®, FUNGAMYL®, DURAMYL®, and NATALASE® (Novo); pectinases; and mixtures thereof. Enzymes can be added herein as prills, granulates, or cogranulates at levels typically in the range from 0.0001% to 2% pure enzyme by weight of the cleaning composition.

Suds suppressers suitable for use in the detergent composition described herein include nonionic surfactants having a low cloud point. "Cloud point" as used herein, is a well known property of nonionic surfactants which is the result of the surfactant becoming less soluble with increasing temperature, the temperature at which the appearance of a second phase is observable is referred to as the "cloud point." As used herein, a "low cloud point" nonionic surfactant is defined as a nonionic surfactant system ingredient having a cloud point of less than 30° C., preferably less than about 20° C., and even more preferably less than about 10° C., and most preferably less than about 7.5° C. Low cloud point nonionic surfactants can include nonionic alkoxylated surfactants, especially ethoxylates derived from primary alcohol, and polyoxypropylene/polyoxyethylene/polyoxypropylene (PO/EO/PO) reverse block polymers. Also, such low cloud point nonionic surfactants can include, for example, ethoxylated-propoxylated alcohol (e.g., BASF POLY-TERGENT® SLF18) and epoxy-capped poly(oxyalkylated) alcohols (e.g., BASF POLY-TERGENT® SLF18B series of nonionics.

Other suitable components for use in the detergent composition described herein include cleaning polymers having anti-redeposition, soil release or other detergency properties. Anti-redeposition polymers for use herein include acrylic acid containing polymers such as SOKALAN® PA30, PA20, PA15, PA10 and SOKALAN® CP10 (BASF GmbH), ACUSOL® 45N, 480N, 460N (Rohm and Haas), acrylic acid/maleic acid copolymers such as SOKALAN® CP5, and acrylic/methacrylic copolymers. Other suitable polymers include amine-based polymers such as alkoxylated polyalkyleneimines (e.g., PEI600 EO20 and/or ethoxysulfated hexamethylene diamine dimethyl quats), which, optionally, may be quaternized. Soil release polymers for use herein include alkyl and hydroxyalkyl celluloses, polyoxyethylenes, polyoxypropylenes and copolymers thereof, and nonionic and anionic polymers based on terephthalate esters of ethylene glycol, propylene glycol and mixtures thereof.

Heavy metal sequestrants and crystal growth inhibitors are also suitable for use in the detergent, for example diethylenetriamine penta(methylene phosphonate), ethylenediamine tetra(methylene phosphonate) hexamethylenediamine tetra(methylene phosphonate), ethylene diphosphonate, hydroxy-ethylene-1,1-diphosphonate, nitrilotriacetate, ethylenediaminotetracetate, ethylenediamine-N,N'-disuccinate in their salt and free acid forms.

Suitable for use in the detergent composition described herein is also a corrosion inhibitor, for example organic silver coating agents (especially paraffins such as WINOG® 70 sold by Wintershall, Salzbergen, Germany), nitrogen-containing corrosion inhibitor compounds (for example benzotriazole and benzimadazole and Mn(II) compounds, particularly Mn(II) salts of organic ligands.

Other suitable components for use in the detergent composition herein include enzyme stabilizers, for example calcium ion, boric acid and propylene glycol.

Suitable rinse additives are known in the art. Commercial rinse aids for dishwashing typically are mixtures of low-foaming fatty alcohol polyethylene/polypropylene glycol ethers, solubilizers (for example cumene sulfonate), organic acids (for example citric acid) and solvents (for example ethanol). The function of such rinse aids is to influence the interfacial tension of the water in such a way that it is able to drain from the rinsed surfaces in the form of a thin coherent film, so that no water droplets, streaks, or films are left after the subsequent drying process.

Laundry Detergent Composition

The laundry detergent composition may be a powder, a liquid or a mixture thereof, preferably a liquid.

The term 'liquid laundry detergent composition' refers to any laundry detergent composition comprising a liquid capable of wetting and treating a fabric, and includes, but is not limited to, liquids, gels, pastes, dispersions and the like. The liquid composition can include solids or gases in suitably subdivided form, but the liquid composition excludes forms which are non-fluid overall, such as tablets or granules.

By powder we herein mean the laundry detergent composition may comprise solid particulates or may be a single homogenous solid. Preferably, the powder laundry detergent composition comprises particles. This means the powder laundry detergent composition comprises individual solid particles as opposed to the solid being a single homogenous solid. The particles may be free-flowing or may be compacted, preferably free-flowing.

The laundry detergent composition can be used in a fabric hand wash operation or may be used in an automatic machine fabric wash operation, preferably an automatic machine fabric wash operation.

Preferably, the laundry detergent composition comprises a non-soap surfactant. The non-soap surfactant is preferably selected from non-soap anionic surfactant, non-ionic surfactant or a mixture thereof. Preferably, the laundry detergent composition comprises between 10% and 60%, more preferably between 20% and 55% by weight of the laundry detergent composition of the non-soap surfactant.

Preferably, the anionic non-soap surfactant comprises linear alkylbenzene sulphonate, alkyl sulphate, alkoxylated alkyl sulphate, or a mixture thereof. Preferably, the alkoxylated alkyl sulphate is an ethoxylated alkyl sulphate.

Preferably, the laundry detergent composition comprises between 5% and 60%, preferably between 15% and 55%, more preferably between 25% and 50%, most preferably between 30% and 45% by weight of the detergent composition of the non-soap anionic surfactant.

Preferably, the non-soap anionic surfactant comprises linear alkylbenzene sulphonate and alkoxylated alkyl sulphate, wherein the ratio of linear alkylbenzene sulphonate to alkoxylated alkyl sulphate preferably the weight ratio of linear alkylbenzene sulphonate to ethoxylated alkyl sulphate is from 1:10 to 10:1, preferably from 6:1 to 1:6, more preferably from 4:1 to 1:4, even more preferably from 3:1 to 1:1. Alternatively the weight ratio of linear alkylbenzene sulphonate to ethoxylated alkyl sulphate is from 1:2 to 1:4. The alkoxylated alkyl sulphate can be derived from a synthetic alcohol or a natural alcohol, or from a blend thereof, pending the desired average alkyl carbon chain length and average degree of branching. Preferably, the synthetic alcohol is made following the Ziegler process, OXO-process, modified OXO-process, the Fischer Tropsch process, Guerbet process or a mixture thereof. Preferably, the naturally derived alcohol is derived from natural oils, preferably coconut oil, palm kernel oil or a mixture thereof.

Preferably, the laundry detergent composition comprises between 0% and 15%, preferably between 0.01% and 12%, more preferably between 0.1% and 10%, most preferably between 0.15% and 7% by weight of the laundry detergent composition of a non-ionic surfactant. The non-ionic surfactant is preferably selected from alcohol alkoxylate, Ziegler-synthesized alcohol alkoxylate, an oxo-synthesized alcohol alkoxylate, Guerbet alcohol alkoxylates, alkyl phenol alcohol alkoxylates or a mixture thereof.

Preferably, the laundry preferably liquid laundry detergent composition comprises between 1.5% and 20%, more preferably between 2% and 15%, even more preferably between 3% and 10%, most preferably between 4% and 8% by weight of the laundry detergent composition of soap, preferably a fatty acid salt, more preferably an amine neutralized fatty acid salt, wherein preferably the amine is an alkanolamine more preferably selected from monoethanolamine, diethanolamine, triethanolamine or a mixture thereof, more preferably monoethanolamine.

Preferably, the laundry detergent composition comprises a non-aqueous solvent, preferably wherein the non-aqueous solvent is selected from 1,2-propanediol, dipropylene glycol, tripropyleneglycol, glycerol, sorbitol, polypropylene glycol or a mixture thereof, preferably wherein the polypropyleneglycol has a molecular weight of 400. Preferably the liquid laundry detergent composition comprises between 10% and 40%, preferably between 15% and 30% by weight of the liquid laundry detergent composition of the non-aqueous solvent. Without wishing to be bound by theory the non-aqueous solvents ensure appropriate levels of film plasticization so the film is not too brittle and not too 'floppy'. Without wishing to be bound by theory, having the correct degree of plasticization will also facilitate film dissolution when exposed to water during the wash process.

Preferably, the liquid laundry detergent composition comprises between 0.5% and 15%, preferably between 5% and 13% by weight of the liquid laundry detergent composition of water.

Preferably, the laundry detergent composition comprises an ingredient selected from the list comprising cationic polymers, polyester terephthalates, amphiphilic graft co-polymers, carboxymethylcellulose, enzymes, perfumes, encapsulated perfumes, bleach or a mixture thereof.

The laundry detergent composition may comprise an adjunct ingredient, wherein the adjunct ingredient is selected from ethanol, ethyleneglycol, polyethyleneglycol, hueing dyes, aesthetic dyes, enzymes, builders preferably citric acid, chelants, cleaning polymers, dispersants, dye transfer inhibitor polymers, fluorescent whitening agent, opacifier, antifoam, preservatives, anti-oxidants, or a mixture thereof. Preferably the chelant is selected from aminocarboxylate chelants, aminophosphonate chelants, or a mixture thereof.

Preferably, the laundry detergent composition has a pH between 6 and 10, more preferably between 6.5 and 8.9, most preferably between 7 and 8, wherein the pH of the laundry detergent composition is measured as a 10% dilution in demineralized water at 20° C.

The liquid laundry detergent composition may be Newtonian or non-Newtonian. Preferably, the liquid laundry detergent composition is non-Newtonian. Without wishing to be bound by theory, a non-Newtonian liquid has properties that differ from those of a Newtonian liquid, more specifically, the viscosity of non-Newtonian liquids is dependent on shear rate, while a Newtonian liquid has a constant viscosity independent of the applied shear rate. The decreased viscosity upon shear application for non-Newtonian liquids is thought to further facilitate liquid detergent dissolution. The liquid laundry detergent composition described herein can have any suitable viscosity depending on factors such as formulated ingredients and purpose of the composition. When Newtonian the composition may have a viscosity value, at a shear rate of 20 s-1 and a temperature of 20° C., of 100 to 3,000 cP, alternatively 200 to 2,000 cP, alternatively 300 to 1,000 cP, following the method described herein. When non-Newtonian, the composition may have a high shear viscosity value, at a shear rate of 20 s-1 and a temperature of 20° C., of 100 to 3,000 cP, alternatively 300 to 2,000 cP, alternatively 500 to 1,000 cP, and a low shear viscosity value, at a shear rate of 1 s-1 and a temperature of 20° C., of 500 to 100,000 cP, alternatively 1000 to 10,000 cP, alternatively 1,300 to 5,000 cP, following the method described herein. Methods to measure viscosity are known in the art. According to the present disclosure, viscosity measurements are carried out using a rotational rheometer e.g. TA instruments AR550. The instrument includes a 40 mm 2° or 1° cone fixture with a gap of around 50-60 μm for isotropic liquids, or a 40 mm flat steel plate with a gap of 1000 μm for particles containing liquids. The measurement is carried out using a flow procedure that contains a conditioning step, a peak hold and a continuous ramp step. The conditioning step involves the setting of the measurement temperature at 20° C., a pre-shear of 10 seconds at a shear rate of 10 s1, and an equilibration of 60 seconds at the selected temperature. The peak hold involves applying a shear rate of 0.05 s1 at 20° C. for 3 min with sampling every 10 s. The continuous ramp step is performed at a shear rate from 0.1 to 1200 s1 for 3 min at 20° C. to obtain the full flow profile.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Examples

FIG. 1 discloses the process according to the present invention. The water-soluble web (1) is moving in the machine direction (2). The water-soluble web (1) comprises flat areas (3) wherein the flat areas (3) comprise a first side (4) and second side (5). The water-soluble web (1) also comprises filled capsules (6). The first side (4) of the water-soluble web (1) contacts the anvil (7) as it passes between the anvil (7) and the rotating knife roll (8). In this example the anvil (7) rotates (11). The rotating knife roll (8) comprises knives (9). As the rotating knife roll (8) rotates (10), the knife (9) cuts the water-soluble web (1).

Figure 2:
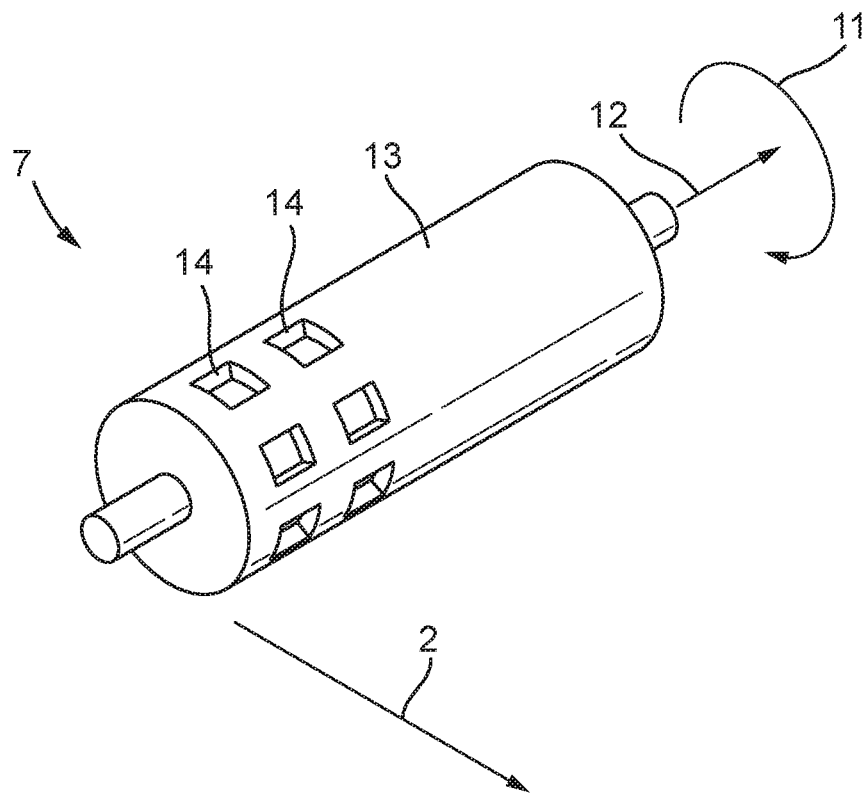
FIG. 2 discloses an anvil (7) according to the present disclosure.

FIG. 2 discloses an anvil (7) according to the present invention. The anvil comprises an axial direction (12) around which it rotates (11). The anvil (7) is a rotating cylindrical anvil having a curved surface (13). The direction of movement of the water-soluble web is the machine direction (2) so the axial direction (12) is perpendicular to the direction of the water-soluble web or machine direction (2). The anvil shown in FIG. 2 also comprises cavities (14) to receive capsules protruding outwards from the first side (4) of the water-soluble web (1) (capsules protruding from first side not shown).

Figure 3:
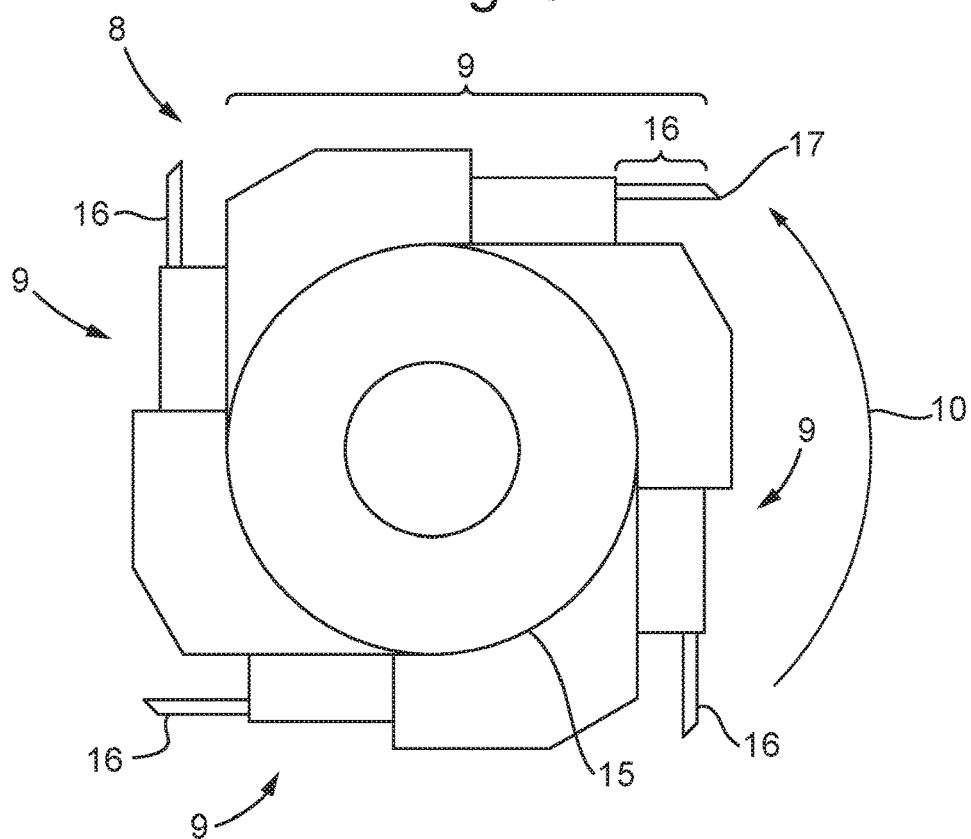
FIG. 3 discloses a cross-section of the rotating knife roll (8).

FIG. 3. discloses a cross-section of the rotating knife roll (8). The rotating knife roll rotates in the direction shown (10), and in this example comprises 4 knives (9), but it is not limited to having 4 knives. The rotating knife roll (8) is cylindrical and has a curved surface (15) and each knife (9) protrudes from said curved surface (15). Each knife (9) has a cutting edge (16). The cutting edge (16) has a tip (17) from which $R_1$ and $R_2$ can be calculated.

Figure 4:
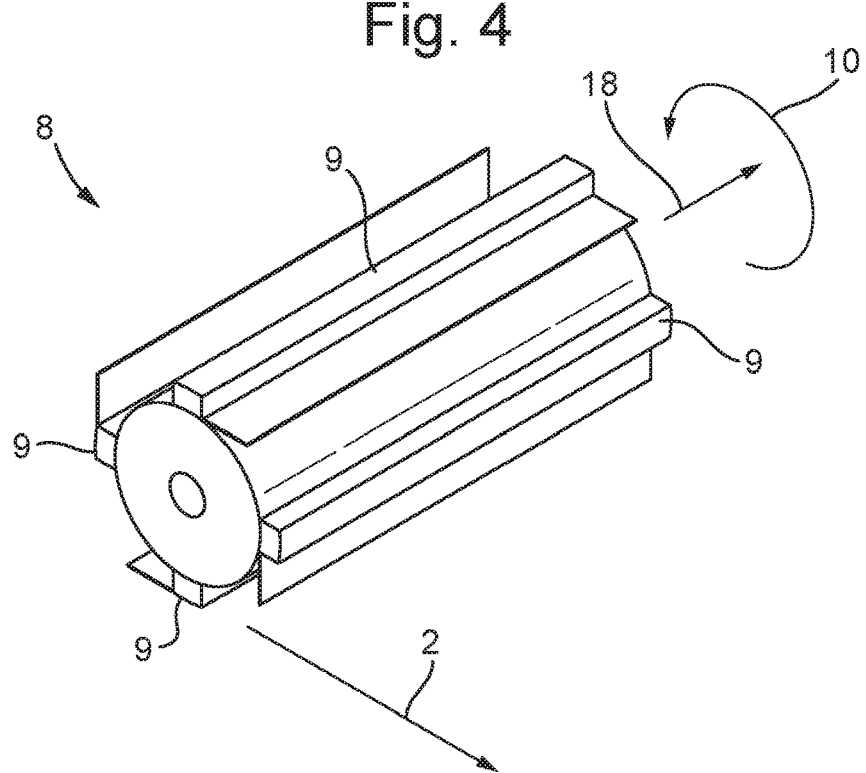
FIG. 4 discloses a 3D representation of the rotating knife roll (8).

FIG. 4 discloses a 3D representation of the rotating knife roll (8). The rotating knife roll rotates in the direction (10). The axial direction (18) is perpendicular to the direction of movement of the water-soluble web (2).

Figure 5:
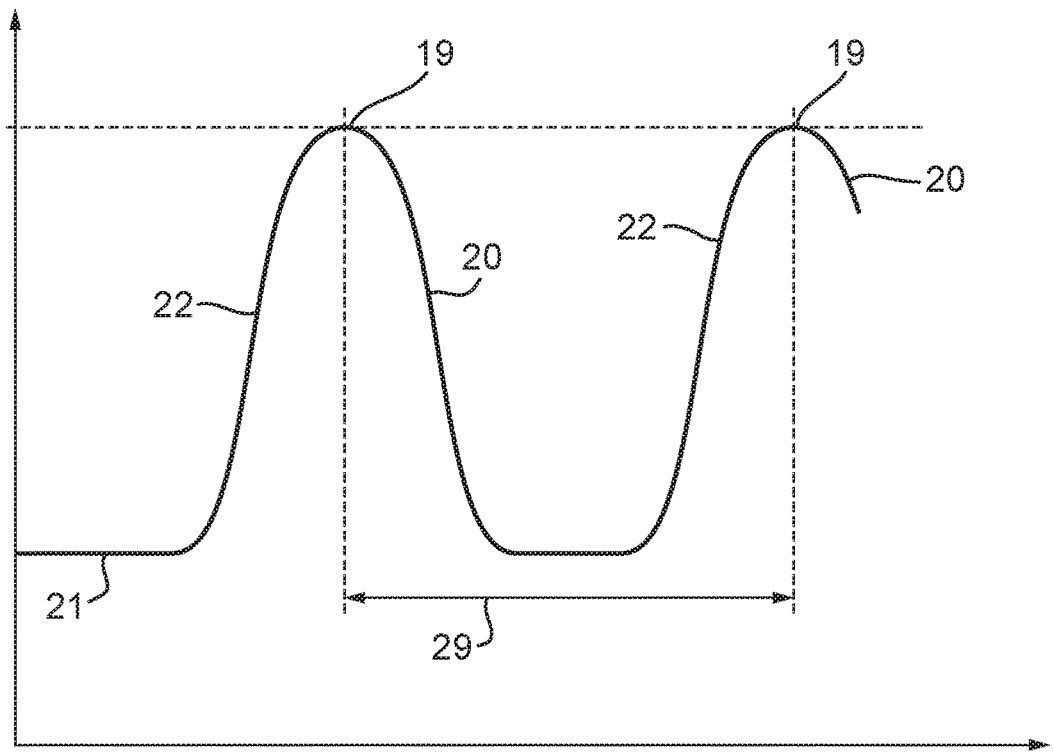
FIG. 5 discloses a chart showing the speed of the tip (17) of a knife (9) as it rotates (10).

FIG. 5 discloses a chart showing the speed of the tip (17) of a knife (9) as it rotates (10). The tip (17) rotates at speed $R_1$ (21) at the point the knife (9) cuts the water-soluble web (1). The tip (17) then accelerates (22) to $R_2$ (19) before decelerating (20) back to $R_1$ (21) for the next cutting action. A single cutting cycle (29) is shown.

Figure 6:
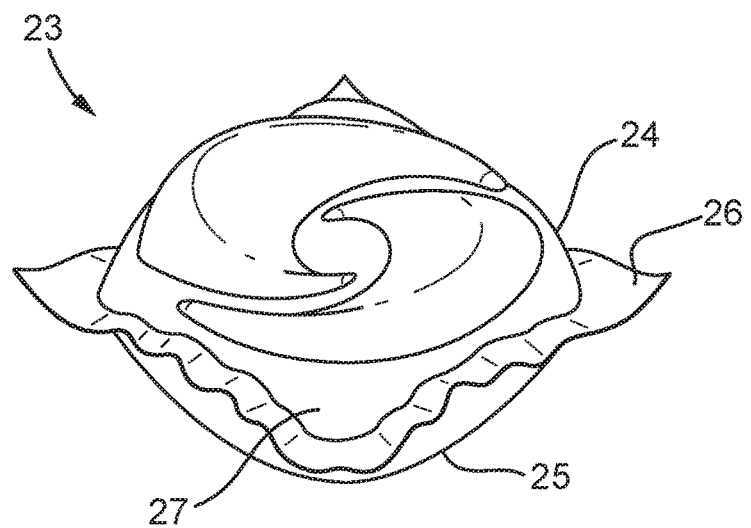
FIG. 6 discloses a water-soluble unit dose article (23) according to the present disclosure.

FIG. 6 discloses a water-soluble unit dose article (23) according to the present invention. The water-soluble unit dose article (23) comprises a first water-soluble film (24) and a second water-soluble film (25) which are sealed together at a seal region (26). A detergent composition (27) is comprised within the water-soluble soluble unit dose article (23).

Figure 7:
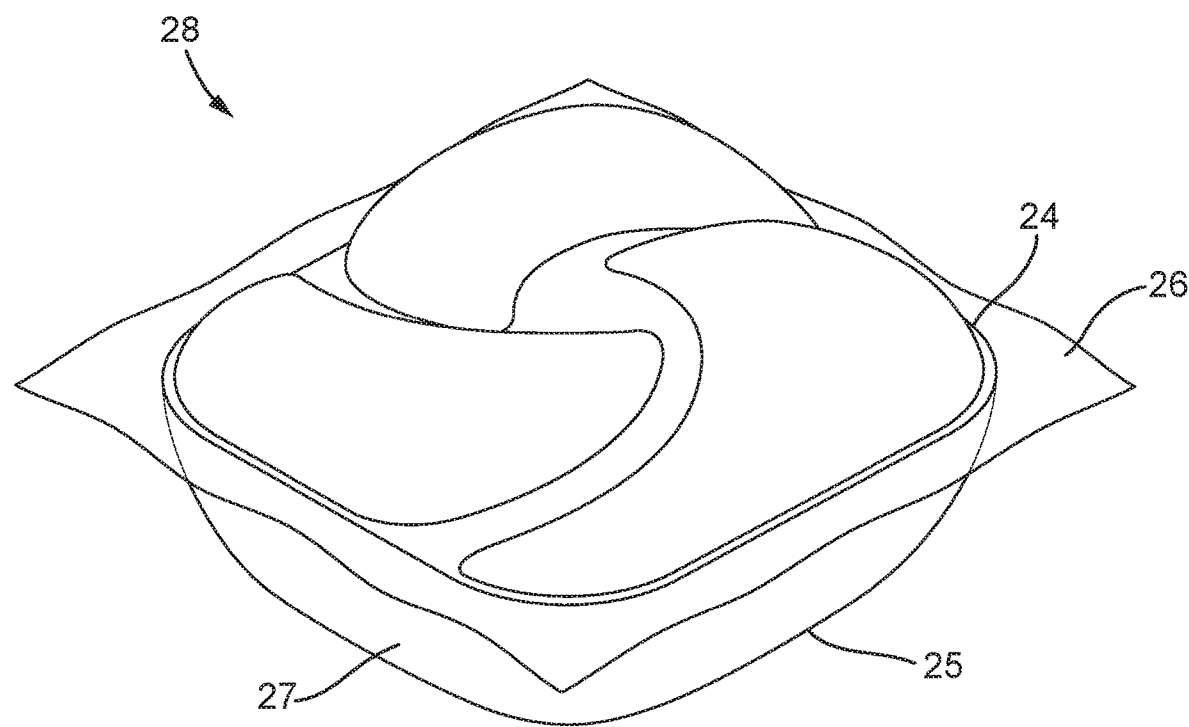
FIG. 7 discloses an alternative water-soluble unit dose article (28) according to the present disclosure.

FIG. 7 discloses an alternative water-soluble unit dose article (28) according to the present invention. The water-soluble unit dose article (23) comprises a first water-soluble film (24) and a second water-soluble film (25) which are sealed together at a seal region (26). A detergent composition (27) is comprised within the water-soluble soluble unit dose article (23).

What is claimed is:

1. A process for cutting a water-soluble web comprising the steps of:
   a. providing an anvil;
   b. providing a rotating knife roll, wherein said rotating knife roll comprises between one and ten knives mounted on said rotating knife roll, and wherein each individual knife comprises a cutting edge wherein said cutting edge extends outwards from said rotating knife roll;
   c. providing a water-soluble web, wherein the water-soluble web comprises:
      i. flat areas wherein the flat areas comprise a first side and a second side, wherein the first side contacts the anvil and the knife contacts the second side during cutting, and wherein the flat areas have a thickness of between 50 microns and 400 microns; and
      ii. filled capsules formed within the water-soluble web, wherein the capsules are connected to and separated from one another by the flat areas and wherein the capsules protrude outwards from the second side; and wherein said water-soluble web is moving in a machine direction at a constant speed $V_1$;
   d. passing said water-soluble web between said anvil and said rotating knife roll, wherein the first side of the water-soluble web is in contact with the anvil;
   e. cutting said water-soluble web with said knives as said water-soluble web passes between said anvil and said rotating knife roll;
   wherein, the rotating knife roll rotates at variable speeds, and wherein a single complete rotation of the rotating knife roll consists of a number of cutting cycles, wherein the number of cutting cycles is equal to the number of knives on the rotating knife roll and wherein during a single cutting cycle, said rotating knife roll rotates at least at a first rotational speed $R_1$ and a second rotational speed $R_2$;
   wherein $R_1$ equals $V_1$, and $R_2$ is at least 15% faster than $R_1$ and wherein the rotating knife roll is rotating at $R_1$ when each individual knife cuts said water-soluble web in a cross-machine direction, and wherein each cut of the water-soluble web is performed by only one of the knives at a time.

2. The process according to claim 1 wherein the knives are spaced apart equally around said rotating knife roll.

3. The process according to claim 1 wherein the rotating knife roll comprises between two and eight knives.

4. The process according to claim 3, wherein the rotating knife roll comprises between four and six knives.

5. The process according to claim 1 wherein $R_2$ is between 50% and 3000% faster than $R_1$.

6. The process according to claim 1, wherein $R_2$ is between 100% and 2000% faster than $R_1$.

7. The process according to claim 1 wherein $V_1$ is between 1 m/s and 30 m/s.

8. The process according to claim 7, wherein $V_1$ is between 2 m/s and 20 m/s.

9. The process according to claim 1 wherein each individual knife is travelling at the speed $R_1$ for between 25% and 75% of the time it takes for each individual knife to do one full rotation.

10. The process according to claim 9, wherein each individual knife is travelling at the speed $R_1$ for between 35% and 75% of the time it takes for each individual knife to do one full rotation.

11. The process according to claim 1 wherein the cross-machine direction is between 80° and 100°, relative to the machine direction.

12. The process according to claim 1 wherein the capsules protrude outwards from the second side by between 2 mm and 15 mm.

13. The process according to claim 1 wherein the water-soluble web comprises a water-soluble polyvinyl alcohol polymer, a water-soluble polyvinyl alcohol copolymer, or a mixture thereof.

14. The process according to claim 1 wherein the process comprises a step of cutting the water-soluble web in a machine direction, wherein the cutting of the water-soluble web in the machine direction is via a continuous constant speed cutting device.

15. The process according to claim 1 wherein the knife roll comprises a surface, wherein each knife protrudes from the surface of said knife roll, and wherein each knife is positioned at an angle between 5° and 90° relative to the surface of the rotating knife roll.

16. The process according to claim 1 wherein the knife roll has a cylindrical shape, and wherein each knife protrudes from the surface of said cylindrical knife roll.

17. The process according to claim 1 wherein the closest distance between the edge of one capsule and the edge of any adjacent capsule is between 3 mm and 15 mm.

* * * * *